(12) United States Patent
Kronberg

(10) Patent No.: US 11,882,212 B2
(45) Date of Patent: Jan. 23, 2024

(54) METHOD AND SYSTEM FOR QUANTUM KEY DISTRIBUTION

(71) Applicant: Terra Quantum AG, St. Gallen (CH)

(72) Inventor: Dmitry Kronberg, St. Gallen (CH)

(73) Assignee: Terra Quantum AG, St. Gallen (CH)

( * ) Notice: Subject to any disclaimer, the term of this patent is extended or adjusted under 35 U.S.C. 154(b) by 73 days.

(21) Appl. No.: 17/585,733

(22) Filed: Jan. 27, 2022

(65) Prior Publication Data

US 2022/0247558 A1    Aug. 4, 2022

(30) Foreign Application Priority Data

Jan. 27, 2021    (EP) ..................................... 21153846

(51) Int. Cl.
*H04L 29/06* (2006.01)
*H04L 9/08* (2006.01)

(52) U.S. Cl.
CPC .................................. *H04L 9/0858* (2013.01)

(58) Field of Classification Search
None
See application file for complete search history.

(56) References Cited

U.S. PATENT DOCUMENTS

| | | | |
|---|---|---|---|
| 10,158,481 B2* | 12/2018 | Bunandar | H04L 9/0852 |
| 2004/0109564 A1* | 6/2004 | Cerf | H04L 9/0858 |
| | | | 380/256 |
| 2006/0059343 A1 | 3/2006 | Berzanskis et al. | |
| 2009/0175450 A1* | 7/2009 | Brandt | H04L 9/0858 |
| | | | 380/256 |
| 2017/0264433 A1 | 9/2017 | Tanizawa | |
| 2019/0305941 A1 | 10/2019 | Fu | |

OTHER PUBLICATIONS

Song, Dan; Chen, Dongxu. Quantum Key Distribution Based on Random Grouping Bell State Measurement. IEEE Communications Letters, vol. 24, Issue: 7. https://ieeexplore.ieee.org/stamp/stamp.jsp?tp=&arnumber=9069197 (Year: 2020).*

(Continued)

*Primary Examiner* — Jeremiah L Avery
(74) *Attorney, Agent, or Firm* — Leydig, Voit & Mayer, Ltd.

(57) ABSTRACT

A system method for quantum key includes providing an initial key in a first data processing device and a second data processing device; providing, in the second data processing device, a quantum signal comprising a plurality of quantum states; determining, in the second data processing device, a plurality of quantum measurement parameters, a raw signal by quantum measuring the plurality of quantum states employing the plurality of quantum measurement parameters; generating with the initial key, in the second data processing device, an encrypted signal; determining, in at least one of the first data processing device and the second data processing device, a reconciled signal from the encrypted signal; determining, in at least one of the first data processing device and the second data processing device, a shared key from the reconciled signal by correcting the first reconciled signal.

15 Claims, 4 Drawing Sheets

(56) References Cited

OTHER PUBLICATIONS

Figure 1:
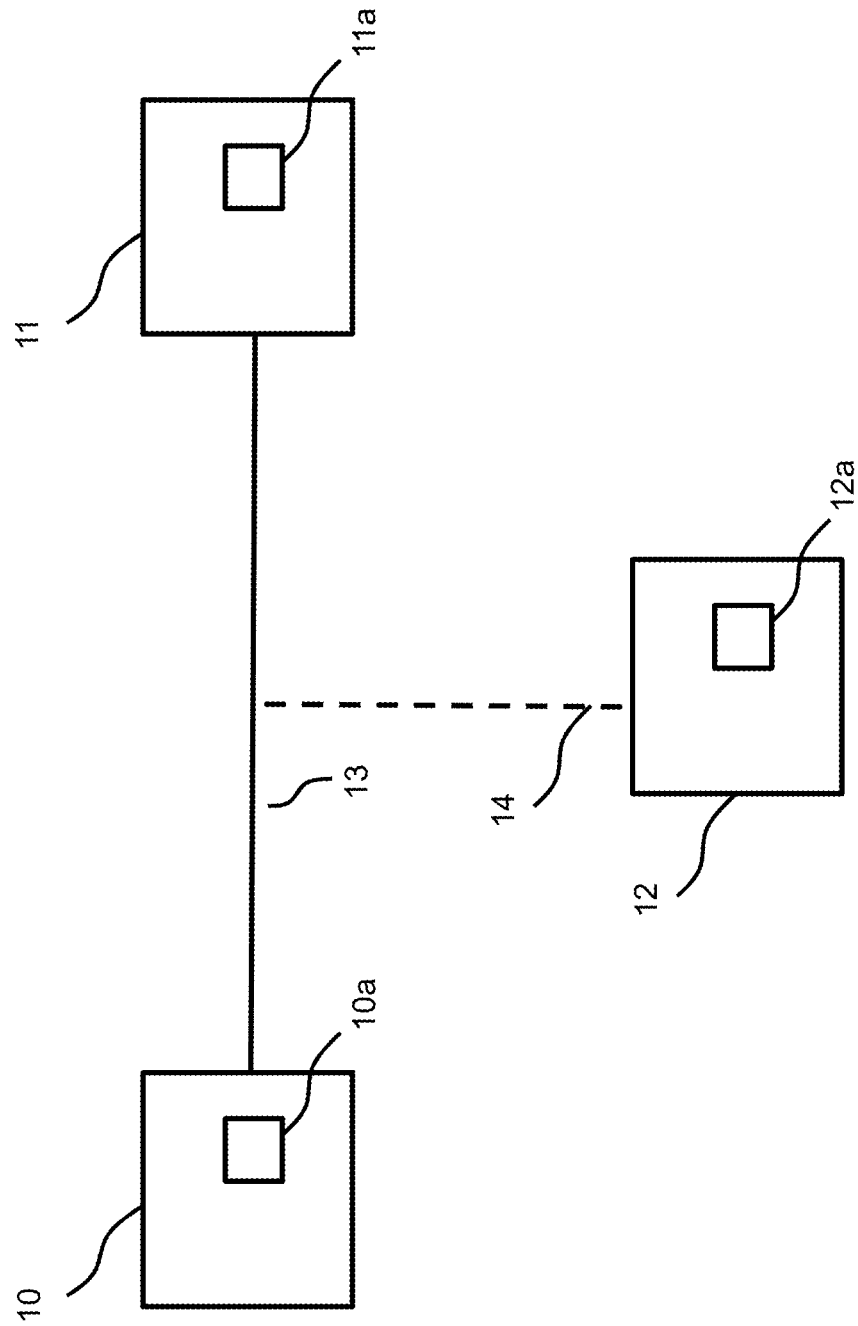

Xie, Dong. Public Key Image Encryption Based on Compressed Sensing. IEEE Access, vol. 7. https://ieeexplore.ieee.org/stamp/stamp.jsp?tp=&arnumber=8835899 (Year: 2019).*

Latinovic, Nikola et al. Bulk Mode Encryption Devices Modification for Usage of Quantum Key Distribution. 2019 27th Telecommunications Forum (TELFOR). https://ieeexplore.ieee.org/stamp/stamp.jsp?tp=&arnumber=8971354 (Year: 2019).*

Horodecki, Karol et al. Quantum Key Distribution Based on Private States: Unconditional Security Over Untrusted Channels With Zero Quantum Capacity. IEEE Transactions on Information Theory, vol. 54, Issue: 6. https://ieeexplore.ieee.org/stamp/stamp.jsp?tp=&arnumber=4529275 (Year: 2008).*

European Patent Office, European Search Report in European Application No. 21153846.7 (dated Jul. 6, 2021).

* cited by examiner

METHOD AND SYSTEM FOR QUANTUM KEY DISTRIBUTION

CROSS-REFERENCE TO RELATED APPLICATIONS

This patent application claims priority to European patent application no. 21153846.7, filed on Jan. 27, 2021, which is incorporated by reference.

FIELD OF THE DISCLOSURE

The present disclosure refers to a method for quantum key distribution. Further, a system for quantum key distribution is disclosed.

BACKGROUND OF THE INVENTION

In quantum locking of classical correlations, a first data processing device ("Alice") transmits a message a of length m to a second data processing device ("Bob"). The message a is to be kept secret until the first data processing device further transmits a key k of length |K| to the second data processing device. It is important to determine how short the key k can be while still able to securely encrypt the message a. If the first and the second data processing device comprise only classical resources, the key k is required to be about as long as the message a, i.e., m≈|K|. An exemplary implementation is represented by a one-time pad. In this instance, security follows from the principle of information causality: By transmitting l bits, correlations between the first and the second data processing device cannot be increased by more than l bits. In case of quantum correlations, however, the principle of information causality may be violated, leading to possible smaller key lengths while still retaining the required degree of security. Conversely, by keeping the key length constant, more information can be securely transmitted. Still, achieving even higher information transmission is desirable.

BRIEF SUMMARY OF THE INVENTION

In one aspect, the present disclosure describes improved techniques for transmitting data via quantum key distribution.

A method and a system for quantum key distribution are provided according to the independent claims. Further embodiments are disclosed in dependent claims.

According to one aspect, a method for quantum key distribution is provided, the method, in a system comprising a plurality of data processing devices, comprising: providing an initial key in a first data processing device and a second data processing device; providing, in the second data processing device, a quantum signal comprising a plurality of quantum states; determining, in the second data processing device, a plurality of quantum measurement parameters; determining, in the second data processing device, a raw signal by quantum measuring the plurality of quantum states employing the plurality of quantum measurement parameters; generating with the initial key, in the second data processing device, an encrypted signal indicating at least one the plurality of quantum measurement parameters and transmitting the encrypted signal to the first data processing device; determining, in at least one of the first data processing device and the second data processing device, a reconciled signal from the encrypted signal; and determining, in at least one of the first data processing device and the second data processing device, a shared key from the reconciled signal by correcting the first reconciled signal.

According to another aspect, a system for quantum key distribution is provided, the system comprising a plurality of data processing devices and configured to perform: providing an initial key in a first data processing device and a second data processing device; providing, in the second data processing device, a quantum signal comprising a plurality of quantum states; determining, in the second data processing device, a plurality of quantum measurement parameters; determining, in the second data processing device, a raw signal by quantum measuring the plurality of quantum states employing the plurality of quantum measurement parameters; generating with the initial key, in the second data processing device, an encrypted signal indicating at least one the plurality of quantum measurement parameters and transmitting the encrypted signal to the first data processing device; determining, in at least one of the first data processing device and the second data processing device, a reconciled signal from the encrypted signal; and determining, in at least one of the first data processing device and the second data processing device, a shared key from the reconciled signal by correcting the first reconciled signal.

The raw signal can be a second raw signal. The encrypted signal can be a second encrypted signal. The reconciled signal can be a second reconciled signal. The plurality of quantum states can be a plurality of second quantum states. The quantum signal may be a second quantum signal.

The method may follow at least one of a BB84 (Bennett-Brassard 1984) protocol, a B92 (Bennett 1992) protocol, an entanglement-based quantum key distribution protocol, a measurement-device-independent quantum key distribution protocol, and a twin-field quantum key distribution protocol. The quantum signal may be transmitted via an optical fiber or, alternatively, via air.

The method may further comprise at least one of: determining, in the first data processing device, a plurality of quantum preparation parameters; preparing, in the first data processing device, a first quantum signal comprising a plurality of first quantum states from a first raw signal employing the plurality of quantum preparation parameters; transmitting the first quantum signal from the first data processing device to the second data processing device, thereby providing the quantum signal comprising the plurality of quantum states in the second data processing device; generating with the initial key, in the first data processing device, a first encrypted signal indicating at least one the plurality of quantum preparation parameters and transmitting the first encrypted signal to the second data processing device; determining, in the second data processing device, the reconciled signal from the raw signal and the first encrypted signal; and determining, in the first data processing device, a first reconciled signal from the first raw signal and the encrypted signal.

The plurality of quantum states can be obtained from the plurality of first quantum states by unitary evolution of each of the plurality of first quantum states. Transmitting the encrypted signal, the first encrypted signal or any further signal encrypted with the initial key may comprise transmitting within a private communication channel.

Each of the plurality of quantum states and/or each of the plurality of first quantum states may be a photonic quantum state. Each of the plurality of quantum states and/or each of the plurality of first quantum states may be a photon polarization state.

At least one of the plurality of quantum measurement parameters and/or at least one of the plurality of quantum preparation parameters may comprise a quantum basis setting. The at least one of the plurality of quantum measurement parameters and/or the at least one of the plurality of quantum preparation parameters may also comprise a type of measurement outcome, for example, indicating an inconclusive result.

The quantum basis setting may comprise measuring in a horizontal/vertical polarization basis or measuring in an anti-diagonal/diagonal polarization basis.

Each one of digit positions of the raw signal in the second data processing device may correspond to one of the plurality of quantum measurement parameters and/or to one of the plurality of quantum states. The reconciled signal may be determined in the second data processing device from the raw signal and the first encrypted signal by discarding one of the digit positions of the raw signal if a corresponding one of the plurality of quantum measurement parameters and a corresponding one of the quantum preparation parameters of the first encrypted signal do not match. Each one of first digit positions of the first raw signal in the first data processing device may correspond to one of the plurality of quantum preparation parameters and to one of the plurality of first quantum states. The first reconciled signal may be determined in the first data processing device from the first raw signal and the encrypted signal by discarding one of the first digit positions of the first raw signal if a corresponding one of the plurality of quantum measurement parameters from the encrypted signal and a corresponding one of the quantum preparation parameters do not match.

Alternatively or additionally, the reconciled signal may be determined in the second data processing device from the raw signal and the quantum preparation parameters by discarding one of the digit positions of the raw signal if a corresponding one of the quantum preparation parameters comprises a discard flag. The discard flag may for example correspond to indication of the inconclusive result. Further, the first reconciled signal may be determined in the first data processing device from the first raw signal and the encrypted signal by discarding one of the first digit positions of the first raw signal if a corresponding one of the plurality of quantum measurement parameters from the first encrypted signal and a corresponding one of the quantum preparation parameters of the encrypted comprises the discard flag.

The method may further comprise at least one of: generating, in the first data processing device, first parity data from the first reconciled signal; encrypting, in the first data processing device, the first parity data to encrypted first parity data with the initial key and transmitting the encrypted first parity data to the second data processing device; generating, in the second data processing device, second parity data from the reconciled signal; encrypting, in the second data processing device, the second parity data to encrypted second parity data with the initial key and transmitting the encrypted second parity data to the first data processing device; determining, in the first data processing device and the second data processing device, differences of the first reconciled signal and the reconciled signal employing the first parity data and the second parity data; and determining, in the first data processing device, the shared key from the first reconciled signal by correcting the first reconciled signal with respect to the differences of the first reconciled signal and the reconciled signal and determining, in the second data processing device, the reconciled signal as the shared key.

The method may also comprise: determining, in the first data processing device, the first reconciled signal as the shared key and determining, in the second data processing device, the shared key from the reconciled signal by correcting the reconciled signal with respect to the differences of the first reconciled signal and the reconciled signal.

The first parity data may comprise first parity bits of first data blocks of the first reconciled signal and the second parity data may comprise second parity bits of second data blocks of the reconciled signal. Alternatively, the first parity data may comprise a first syndrome of the first reconciled signal and the second parity data may comprise a second syndrome of the reconciled signal.

The first syndrome may be determined by multiplying one of a plurality of check matrices to a first part of the first reconciled signal. The second syndrome may be determined by multiplying one of the plurality of check matrices to a second part of the second reconciled signal. Check matrix information indicating at least one of the plurality of check matrices may be determined in the first data processing device or the second data processing device. The check matrix information may be transmitted without encrypting the check matrix information. Each one of the plurality of check matrices, the first syndrome, and/or the second syndrome may be binary-valued.

Correcting the first reconciled signal and/or the reconciled signal may comprise locating an erroneous digit position. The erroneous digit position may be determined employing an error vector. The error vector may be determined from one of the plurality of check matrices and an error syndrome. The error syndrome may be determined by binary addition of the first syndrome and the second syndrome.

The erroneous digit position may also be determined by binary search. The binary search may comprises iteratively partitioning the first reconciled signal and the reconciled signal into first data blocks and second data blocks respectively and determining and comparing first parity values of the first data blocks and second parity values of the second data blocks.

The method may further comprise at least one of: generating, in the first data processing device, first error information from the first reconciled signal, preferably encrypting the first error information to encrypted first error information with the initial key, and further preferably transmitting the first error information or the encrypted first error information to the second data processing device; generating, in the second data processing device, second error information from the reconciled signal, preferably encrypting the second error information to encrypted second error information with the initial key, and further preferably transmitting the second error information or the encrypted second error information to the first data processing device; determining, in the first data processing device and the second data processing device, from the first error information and the second error information an error estimate of the first reconciled signal and the reconciled signal; and discarding erroneous parts of the first reconciled signal and the reconciled signal employing the first error information and the second error information.

The first error information and the second error information may comprise first parity bits of the first reconciled signal or parts thereof and second parity bits of the second reconciled signal or parts thereof, respectively. The first error information and the second error information may be correlated with first reconciled signal and the second reconciled signal.

The method may further comprise: in the first data processing device, determining hashing data and encrypting the hashing data to encrypted hashing data with the initial key; and transmitting the encrypted hashing data to the second data processing device. The method may also comprise: in the second data processing device, determining the hashing data and encrypting the hashing data to the encrypted hashing data with the initial key; and transmitting the encrypted hashing data to the first data processing device. The method may further comprise: determining, in the first data processing device and the second data processing device, an amplified key from the shared key by applying a hashing method using the hashing data.

The hashing data may indicate a random selection of a binary Toeplitz matrix.

At least one of the first parity data, the second parity data, and the hashing data may comprise correlated data which are correlated with at least one of the reconciled signal, the first reconciled signal, the shared key, and the amplified key.

The method may further comprise at least one of: generating, in the first data processing device, first uncorrelated parity data which are which are not correlated with at least one of the first reconciled signal, the shared key, and the amplified key and transmitting the first uncorrelated parity data to the second data processing device; and generating, in the second data processing device, second uncorrelated parity data which are not correlated with at least one of the reconciled signal, the shared key, and the amplified key and transmitting the second uncorrelated parity data to the first data processing device.

Alternatively, the first uncorrelated parity data and the second uncorrelated parity data may also be encrypted and subsequently be transmitted.

The uncorrelated data may comprise data block information indicating the partitioning of the first and the second reconciled signal into the first data blocks and the second data blocks.

The method may further comprise: providing a second initial key in the first data processing device and the second data processing device and authenticating the first data processing device and the second data processing device by the second initial key.

The second initial key may be different from the initial key. Alternatively, the initial key and the second initial key are identical. For example, transmitted classical signals can be authenticated by appending a signature generated with the second initial key to each of the transmitted classical signals.

The shared key and/or the amplified key may be determined only in the first data processing device and a third data processing device. The method may further comprise: determining, in the third data processing device, a plurality of further quantum preparation parameters; preparing, in the third data processing device, a third quantum signal comprising a plurality of third quantum states from a third raw signal employing a plurality of further quantum preparation parameters; transmitting the third quantum signal from the third data processing device to the second data processing device.

Each of the plurality of quantum states may be a reduced state of one of a plurality of shared entangled quantum states between the first data processing device and the second data processing device.

Each of the plurality of shared entangled quantum states can comprise an entangled pair of photons.

The initial key may be provided using an RSA (Rivest-Shamir-Adleman) method or a Diffie-Hellman method. The initial key may also be distributed in a different way, e.g., with a trusted courier. The initial key may be provided (distributed) in the first data processing device and the second data processing device. Additionally, the initial key may be provided in the third data processing device.

Further classical messages may be encrypted using the shared key or the amplified key. The encryption may be carried out using a one-time pad method or a symmetric key method, preferably advanced encryption standard (AES).

A shared key length may be equal to a first parity data length and/or a second parity data length, in particular equal to a first syndrome length and/or a second syndrome length. Alternatively, an amplified key length may be equal to the first parity data length and/or the second parity data length, in particular equal to the first syndrome length and/or the second syndrome length.

At least one of, preferably each of, the first raw signal, the raw signal, the first encrypted signal, the encrypted signal, the first reconciled signal, the reconciled signal, the shared key, and the amplified key can be a classical signal. At least one of, preferably each of, the first raw signal, the raw signal, the first encrypted signal, the encrypted signal, the first reconciled signal, the reconciled signal, the shared key, and the amplified key can consist of binary values, in particular, can have one binary value per digit position. The initial key and/or the second initial key may be provided only in the first data processing device and the second data processing device and, optionally, the third data processing device, but not in an outside data processing device.

The aforementioned embodiments related to the method for quantum key distribution can be provided correspondingly for the system for quantum key distribution.

BRIEF DESCRIPTION OF THE SEVERAL VIEWS OF THE DRAWING(S)

Figure 2:
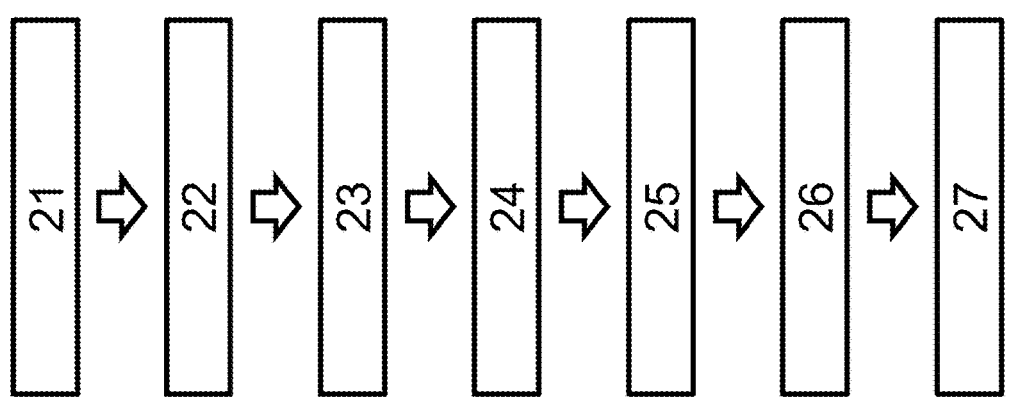
Figure 3:
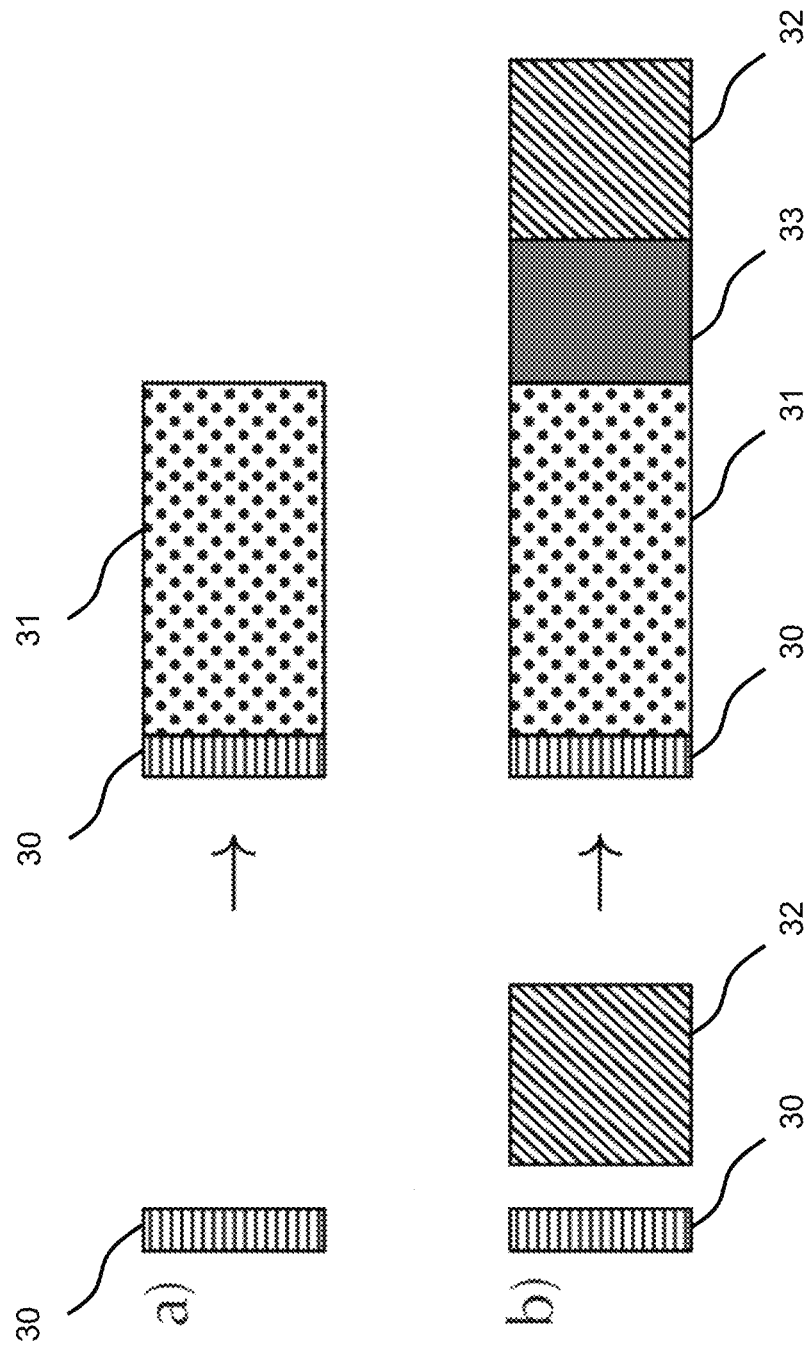
Figure 4:
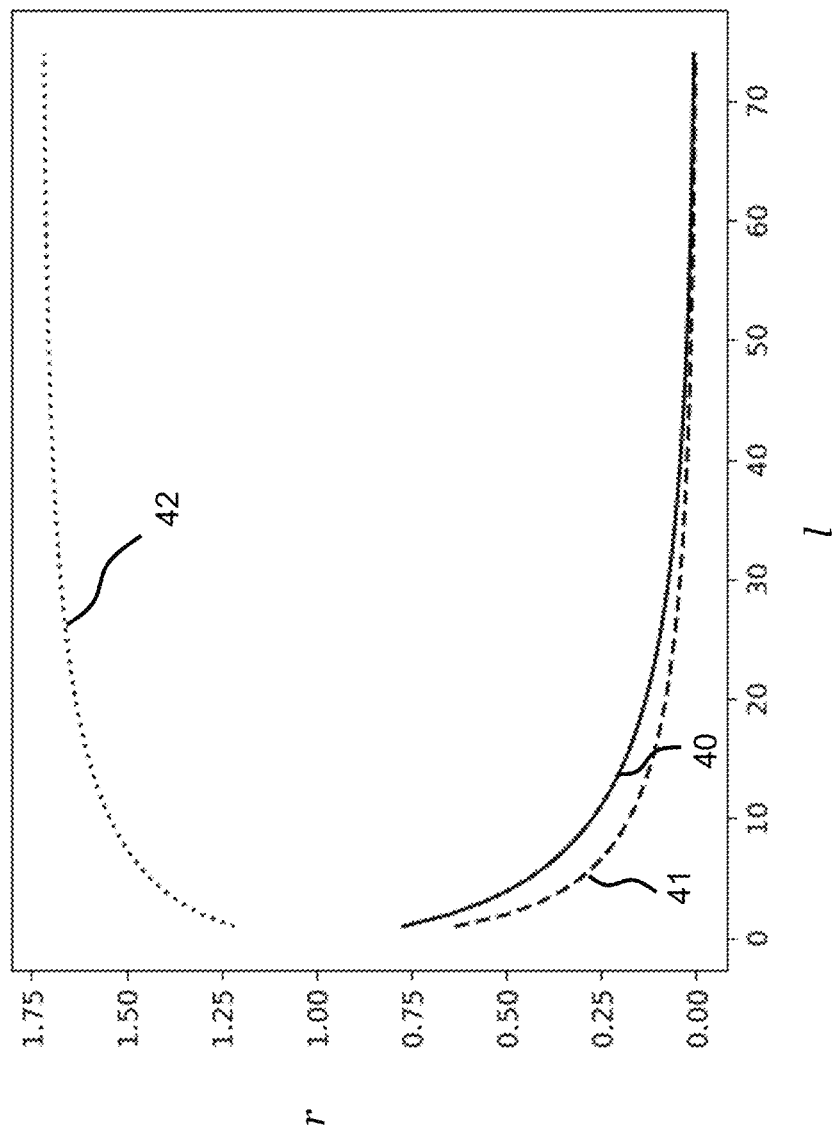

In the following, embodiments, by way of example, are described with reference to the Figures, in which:

FIG. 1 shows a graphical representation of an arrangement of a system for quantum key distribution and an outside data processing device, FIG. 2 shows a graphical representation of a method for quantum key distribution, FIGS. 3(*a*) and (*b*) show diagrams comparing conventional quantum key distribution and the method for quantum key distribution, and FIG. 4 shows a graphical representation of a simulated key rate as a function of the communication channel length for conventional quantum key distribution and the proposed method.

DETAILED DESCRIPTION OF THE INVENTION

FIG. 1 shows a graphical representation of an arrangement of a system for quantum key distribution and an outside data processing device 12. The system comprises a first data processing device 10 ("Alice") and a second data processing device 11 ("Bob"). The first data processing device 10 comprises a first memory 10*a* and the second data processing device 11 comprises a second memory 11*a*.

The first data processing device 10 and the second data processing device 11 can exchange classical signals and/or quantum signals, for example via a communication channel 13. The communication channel 13 may comprise a quantum channel configured to convey the quantum signals. For example, the communication channel 13 may comprise an optical fiber. The communication channel 13 can also be a free space between the first data processing device 10 and the second data processing device 11. The communication channel 13 may also comprise a classical channel for transmitting the classical signals. The optical fiber may be shared by the quantum channel and the classical channel. Alternatively, the quantum channel and the classical channel can be separate.

The system may comprise a plurality of further data processing devices, in particular, a third data processing device with a third memory (not shown). The third data processing device may be connected to the communication channel 13. Additionally or alternatively, the third data processing device can exchange the classical signals and/or the quantum signals with the first data processing device 10 and/or the second data processing device 11 via further communication channels.

The outside data processing device 12 ("Eve") with outside memory 12a is outside the system and represents a potential eavesdropping device with potential access to the communication channel 13, e.g., via a connection 14. The outside data processing device 12 may be arranged at the communication channel 13 such that at least one or any of the classical and/or quantum signals transmitted via the communication channel 13 is received and/or retransmitted by the outside data processing device 12. The outside data processing device 12 may also access the further communication channels. The outside data processing device 12 may also be connected to a plurality of further outside data processing devices, each of which may have access to the communication channel 13 and/or each of which can be arranged closer to the first data processing device 10 or the second data processing device 11.

The first memory 10a, the second memory 11a, the third memory, and the outside memory 12a each comprise a quantum memory that is configured to store the quantum signals and a classical memory that is configured to store the classical signals. The quantum memory may be provided using optical delay lines, controlled reversible inhomogeneous broadening (CRIB), a Duan-Lukin-Cirac-Zoller (DLCZ) scheme, revival of silenced echo (ROSE), and/or hybrid photon echo rephasing (HYPER).

The first, the second, the third, and the outside data processing device (10, 11, 12) each comprise means to transmit and/or receive quantum states.

First classical mutual information I(X: Y) of first classical data X (for example in the first memory 10a of the first data processing device 10 or in the third memory of the third data processing device) and second classical data Y (for example in the second memory 11a of the second data processing device 11) is given by $$I_{cl}(X:Y)=H(X)-H(X|Y),\quad(1)$$

with Shannon entropy H(X) of the first classical data X and Shannon entropy H (X|Y) of the first classical data X conditional on knowing the second classical data Y.

In case the first data processing device 10 and the second data processing device 11 together comprise a shared quantum state $\rho_{AB}$, generalizations of the classical mutual information $I_{cl}(A: B)$ can be defined.

First quantum mutual information I(A: B) of first data A (for example in the first memory 10a) and second data B (for example in the second memory 11a) with $$I(A:B)=S(A)-S(A|B),\quad(2)$$

wherein each of the first data A and the second data B may comprise both quantum and classical information, is defined in terms of (von Neumann) entropy S instead of the Shannon entropy H. In case of no quantum correlations, the first quantum mutual information I(A: B) coincides with the first classical mutual information $i_{cl}(A: B)$.

Accessible information $I_{acc}(A: B)$ of the first data A and the second data B with $$J_{acc}(A:B) = \max_{M_B} I(A:B) = S(\rho_A) - \min_{M_B}\sum_b p_b S(\varrho_{A|b})\quad(3)$$

quantifies a maximum amount of the classical correlations between the first data A and the second data B that can be determined in the second data processing device 11 by carrying out measurements described by a quantum observable $M=\{M_b\}$, wherein each $M_b$ is a non-negative Hermitian operator and wherein the $M_b$ sum to identity: $\Sigma_b M_b = I$. When applied to a subsystem B of the state $\varrho_{AB}$, a measurement outcome b arises with a probability $p_b = \text{Tr}(\varrho_{AB} \cdot I_A \otimes M_b)$ when measuring the shared quantum state $\varrho_{AB}$. A (matrix) trace is denoted by Tr. The non-negative Hermitian operator $M_b$ corresponds to the measurement outcome b. Further, a B-reduced quantum state is denoted by $\varrho_{A|B} = \text{Tr}_B(I_A \otimes \sqrt{M_b} \cdot \varrho_{AB} \cdot I_A \otimes \sqrt{M_b})$. A partial trace with respect to B is denoted by $\text{Tr}_B$.

Quantum discord $D^{(\overline{AB})}$ is defined as difference between all correlations and the classical correlations. The quantum discord D quantifies only quantum correlations between the first data processing device 10 and the second data processing device 11:

$$D^{\overline{AB}} = I(A: B) - I_{acc}(A: B).\quad(4)$$

The accessible information $I_{acc}$ can violate a chain rule and thus the principle of information causality. In particular, for certain quantum states, the following holds:

$$I_{acc}(A,K:B,K) > I_{acc}(A,K:B) + |K|.\quad(5)$$

with first accessible information $I_{acc}(A, K: B, K)$ denoting the accessible information in case the key k with key data K has been transmitted from the first data processing device 10 to the second data processing device 11 and second accessible information $I_{acc}(A, K: B)$ denoting the accessible information in case the key k has not been transmitted to the second data processing device 11. Here, measuring with the key data K can provide more information than measuring without key data K and obtaining the key k only subsequently.

An exemplary state $\tilde\varrho_{AB}$ for which Eq. (5) holds is represented by $$\varrho_{AB} = \frac{1}{2^{m+1}}\sum_{a=0}^{2^m-1}\sum_{k=0}^{1}|a,k\rangle\langle a,k|_A \otimes (U_k|a\rangle\langle a|U_k^\dagger)_B,\quad(6)$$

with elementary states $|a\rangle$ and $|a, k\rangle$, unitary matrices $U_k$, identity matrix $U_0$, and $U_1|a\rangle$ being mutually unbiased with $|a\rangle$. The conjugate transpose is denoted with $(\cdot)^\dagger$. A-quantum states indexed with A (left of tensor product $\otimes$) are in the first data processing device 10, B-quantum states indexed with B (right of the tensor product $\otimes$) are in the second data processing device 11. For the exemplary state $\tilde\rho_{AB}$, the first accessible information is $I_{acc}(A, K: B, K) = m+1$ and the second accessible information is $I_{acc}(A, K: B) = m/2$. Hence, there is m/2 extra information obtained with the key k comprising only a single bit. The quantum discord D quantifies an advantage of quantum data locking.

The goal is to restrict access of the outside data processing device 12 to shared data between the first data processing device 10 and the second data processing device 11. In general, in order to minimize the access to the shared data, a second quantum mutual information I(A: E) of the second data processing device 10 and the outside data processing device 12 is to be determined and minimized.

The second quantum mutual information I(A: E) can be determined by access indicator parameters determined in the second data processing device 11. The access indicator parameters may comprise for example a quantum bit error rate.

Subsequently, error correction and privacy amplification is performed in the first data processing device 10 and the second data processing device 11, yielding the key k with key rate $$r_{key} \approx I(A: B) - I(A: E). \quad (7)$$

Assuming the outside data processing device 12 is provided with practically unbounded resources and an ability of performing any measurement type including collective measurements, the second quantum mutual information I(A: E) is bounded by a Holevo capacity $C_\chi$:

$$I(A:E) \leq C_\chi = \quad (8)$$

$$\max_{p_i^E} \chi(\{p_i^E\}, \{\varrho_i^E\}) = \max_{p_i^E}\left[H\left(\sum_i p_i^E \varrho_i^E\right) - \sum_i p_i^E H(\varrho_i^E)\right],$$

where $\{\varrho_i^E\}$ is a set of third quantum states in the outside data processing device 12, each third quantum state $\varrho_i^E$ is occurring with a third probability $p_i^E$ or and $\chi$ is called Holevo value. For a proof of security of the method, sets of states which can lead to the determined access indicator parameters can be considered and with this, the second quantum mutual information I(A: E) can be bounded.

FIG. 2 shows a graphical representation of a method for quantum key distribution.

The method allows for decreasing an amount of data that can be determined in the outside data processing device 12. Correspondingly, the second quantum mutual information I(A: E) can be bounded by a lower value than $C_\chi$. To this end, no classical information about the key k or further signals correlated therewith must be determined by the outside data processing device 12. This can be achieved by encrypting post-processing information which is generated during post-processing and may be determined by the outside data processing device 12. With the second quantum mutual information I(A: E) decreasing, the key rate $r_{key}$ is increased (cf. Eq. (7)).

In a first step 21, an initial secret key is provided in the first data processing device 10 and the second data processing device 11. This can for example be achieved by employing a known classical key distribution protocol or quantum key distribution protocol or a previous key from a preceding execution of the method. Further, a second initial key is provided in the first data processing device 10 and the second data processing device 11 for mutual authentication.

In a second step 22, a first quantum signal comprising a plurality of first quantum states $\{\varrho_i^A\}$, is generated in the first memory 10a of the first data processing device 10 by employing a random number generator with a probability distribution $\{p_i^A\}_i$. To this end, an intermediate classical signal may be generated with the probability distribution $\{p_i^A\}_i$, and stored in the classical memory of the first memory 10a, and the first quantum signal may be generated according to the intermediate classical signal. The probability distribution $\{p_i^A\}_i$ can be a uniform probability distribution. Each first quantum state $\varrho_i^A$ can encode and correspond to one digit, for example one bit, of a (classical) first raw signal. The first quantum signal is transmitted from the first data processing device 10 to the second data processing device 11 via the communication channel 13.

If the plurality of first quantum states $\{\rho_i^A\}_i$ can be received in the outside data processing device 12 (via the connection 14) and the outside data processing device 12 is able to carry out a collective (measurement) attack, a unitary operation $U_{AE}$: $H_A \otimes H_E \rightarrow H_B \otimes H_E$ (with Hilbert spaces $H_A$ and $H_E$ corresponding to subsystems A and E, respectively) is performed on each of the plurality of first quantum states $\{\varrho_i^A\}$ and ancilla $\varrho^E$, yielding a plurality of third quantum states $\{\varrho_i^A\}$ (corresponding to $\{Tr_B(U_{AE} \cdot \varrho_i^A \otimes \varrho^E \cdot U_{AE}^\dagger)\}$) in the outside memory 12a of the outside data processing device 12 and, after further transmitting to second data processing device 11, yielding a plurality of (second) quantum states $\{\varrho_i^B\}$ (corresponding to $\{Tr_E(U_{AE} \cdot \varrho_i^A \otimes \varrho^E \cdot U_{AE}^\dagger)\}$) in the second memory 11a of the second data processing device 11.

In a third step 23, a plurality of quantum measurement parameters is determined in the second data processing device 11, for example using a random distribution. Further, the plurality of second quantum states $\{\rho_i^B\}_i$ is measured in the second data processing device 11 employing the plurality of quantum measurement parameters, yielding a (second) raw signal, which is classical. Each one of digit positions of the second raw signal corresponds to one of the plurality of quantum measurement parameters and to one of the plurality of second quantum states.

In a fourth step 24, basis reconciliation is carried out in the first data processing device 10 and the second data processing device 11 using the communication channel 13.

In an embodiment, a (second) reconciled signal is determined in the second data processing device (11) from the second raw signal and measurement outcomes by discarding a (second) digit position of the second raw signal if a corresponding one of the measurement outcomes is an inconclusive result. Further, a (second) encrypted signal is generated with the initial key in the second data processing device (11) and transmitted to the first data processing device (10). The second encrypted signal indicates the measurement outcomes corresponding to the inconclusive results. The second encrypted signal is subsequently decoded in the first data processing device (10). A first reconciled signal is then determined in the first data processing device (10) from the first raw signal by discarding a first digit position of the first raw signal if a corresponding one of the measurement outcomes corresponds to an inconclusive result.

In another embodiment, a first encrypted signal indicating at least one the plurality of quantum preparation parameters is generated with the initial key in the first data processing device (10) and transmitted to the second data processing device (11). Conversely, the second encrypted signal, indicating at least one the plurality of quantum measurement parameters, is generated with the initial key in the second data processing device (1) and transmitted to the first data processing device (10).

The first reconciled signal is then determined in the first data processing device (10) from the first raw signal and the second encrypted signal by discarding one of the first digit positions of the first raw signal if a corresponding one of the plurality of quantum measurement parameters from the second encrypted signal and a corresponding one of the quantum preparation parameters do not match.

Further, the second reconciled signal is determined in the second data processing device (11) from the second raw signal and the plurality of quantum measurement parameters by discarding one of the digit positions of the second raw signal if the corresponding one of the plurality of quantum measurement parameters and the corresponding one of the quantum preparation parameters do not match.

In known protocols, no such encryption with the initial key is employed.

In a fifth step 25, an error estimate of the first reconciled signal and the second reconciled signal is determined. To this end, first error information from the first reconciled signal is generated in the first data processing device (10), optionally encrypted with the initial key, and transmitted to the second data processing device (11). Conversely, second error information from the second reconciled signal is generated in the second data processing device (11), optionally encrypted with the initial key, and transmitted to the first data processing device (10). The error estimate is then determined in the first data processing device (10) and the second data processing device (11) from the first error information and the second error information. The first error information and the second error information can for example comprise first parity bits of the first reconciled signal or parts thereof and second parity bits of the second reconciled signal or parts thereof, respectively. In this case, the first error information and the second error information are encrypted before transmission. Further, the error estimate is determined by comparing the first parity bits and the second parity bits. Additionally or alternatively, the error estimate may also comprise visibility and/or decoy states statistics.

The first error information can also comprise a first subset of first digit positions in the first reconciled signal and the second error information can comprise a second subset of second digit positions in the second reconciled signal. In this case, the first error information and the second error information need not be encrypted. A union of the first subset of first digit positions and the second subset of second digit positions is subsequently discarded from the first and the second reconciled signal.

If the error rate is above a threshold, the method is aborted. Otherwise, the method is continued. The error estimate also provides an estimate for the second quantum mutual information I(A: E) or for third quantum mutual information I(B: E). Erroneous parts of the first and second reconciled signal may be discarded.

In a sixth step 26, an error correction is carried out. To this end, first parity data may be generated from the first reconciled signal in the first data processing device (10), encrypted with the initial key, and transmitted to the second data processing device (11). Additionally or alternatively, second parity data may be generated from the second reconciled signal in the second data processing device (11), encrypted with the initial key, and transmitted to the first data processing device (10).

Subsequently, differences of the first reconciled signal and the second reconciled signal from the first parity data can be determined in the second data processing device (11). Additionally or alternatively, the differences can be determined in the first data processing device (10).

With this, a shared key in both the first data processing device (10) and the second data processing device (11) can be determined according to different embodiments.

According to one embodiment, the shared key is determined in the first data processing device (10) from the first reconciled signal by correcting the first reconciled signal with respect to the differences of the first reconciled signal and the second reconciled signal. In the second data processing device (11), the second reconciled signal is determined to be the shared key. Notably, the shared key only needs to be the same in both the first data processing device (10) and the second data processing device (11), whereas the concrete value of the shared key is in general randomly determined. Here, the second reconciled signal is determined to be a master signal and the first reconciled signal is corrected (reverse reconciliation).

According to another embodiment, the shared key is determined in the second data processing device (11) from the second reconciled signal by correcting the second reconciled signal with respect to the differences of the first reconciled signal and the second reconciled signal. In the first data processing device (10), the first reconciled signal is determined to be the shared key. Here, the first reconciled signal is determined to be the master signal and the second reconciled signal is corrected (direct reconciliation).

The first parity data may comprise first parity bits of first data blocks of the first reconciled signal and the second parity data may comprise second parity bits of second data blocks of the second reconciled signal (CASCADE method). Data block information indicating a partitioning of the first and the second reconciled signal into the data blocks may, on the other hand, be transmitted without encrypting the data block information.

Alternatively, the first parity data may comprise a first syndrome of the first reconciled signal and the second parity data may comprise a second syndrome of the second reconciled signal (linear error-correcting code/linear block code method). The first syndrome and the second syndrome can be determined by multiplying one of a plurality of check matrices to a (vectorized) data block of the first and the second reconciled signal, respectively. Notably, each syndrome bit constitutes a parity bit for one-valued bits in a corresponding row of the one of the plurality of check matrices. Check matrix information indicating at least one of the plurality of check matrices may, on the other hand, be transmitted without encrypting the check matrix information.

From the first parity data and/or the second parity data, in particular from a number of disclosed parity bits and/or from a length of the first and/or second syndrome, an amount of information leakage may be determined. Partial key information that may be determined in the outside data processing device 12 can become larger for increasing information leakage.

The goal of the sixth step 26 is to prevent leakage of classical information about the first and the second reconciled signal and consequently of the shared key. Before the sixth step 26, the third quantum states $\{\varrho_i^E\}_i$ may have been provide in the outside memory 12a of the outside data processing device with the third probabilities $\{p_i^E\}_i$. If the outside data processing device 12 comprises collective attack means, the third probabilities $\{p_i^E\}_i$ do not depend on any shared key digit position $k_1, k_2, \ldots, k_N$ of the shared key constructed as $k=k_1k_2\ldots k_N$. Hence, a combined probability for each third quantum signal $\varrho_{(k)}^E = \varrho_{k_1}^E \otimes \varrho_{k_2}^E \otimes \ldots \otimes \varrho_{k_N}^E$, corresponding to the shared key $k=k_1k_2\ldots k_N$, has a product form $$p_{(k)}^E = p_{k_1} \cdot p_{k_2} \cdot \ldots \cdot p_{k_N}. \tag{9}$$

For such a third quantum signal (as product quantum states) and product probability distribution $\{p_{(k)}^E\}$, a quantum channel capacity is additive and individual measurements provide the best results:

$$\max_{M_N} I_N(A^N:E^N) = N \cdot \max_{M_1} I_1(A:E). \quad (10)$$

Here, the left-hand side represents a maximization over all observables $M_N$ on N quantum states (N-shot mutual information $I_N$) and the right-hand side represents an individual maximization over individual observables $M_1$ on a single quantum state (one-shot mutual information $I_1$). Hence, before the sixth step 26, information about the shared key per bit is bounded by the one-shot mutual information $I_1$, which corresponds to individual measurements.

At the sixth step 26, without encrypting the first and the second parity data, some shared key information may be leaked to the outside data processing device 12. For the CASCADE method, the information leakage may be due to first and second parity bits of data blocks to be transmitted. For the linear error correcting code method, the information leakage may be due to the first and/or the second syndrome to be transmitted. Importantly, every leaked parity bit halves a number of possible bit combinations (code words) for the shared key in the first data processing device 10 and the second data processing device 11. For example, for bit strings of three bits, a parity bit value of 1 implies that the bit strings 000, 011, 101 and 110 have zero probability each. Thus, only four out of eight combinations remain and the combined probability $p_{(k)}^E$ for each third quantum signal $\varrho_{(k)}^E$ is changed.

In case of error correcting without encrypting the first parity data and the second parity data, the first data processing device 10 and the outside data processing device 12 end up in a classical-quantum channel situation when coding is performed. In particular, if C bits have been leaked, the number of possible bit combinations for the shared key is reduced from $2^N$ to $2^{N-C}$. Hence, regarding the first data processing device 10 and the outside data processing device 12, the requirements of the quantum channel coding theorem are satisfied in that a set of code words has been provided by the first data processing device 10, and the collective measurements can be performed by the outside data processing device 12, requiring knowledge of the set of code words. A maximal mutual information per digit position employing the collective measurements is provided by the Holevo value (cf. Eq. (8)), which is larger than the one-shot mutual information $I_1$ in Eq. (10).

In case of error correcting without encrypting the first and the second parity data, the first data processing device 10 and the outside data processing device 12 can be considered to perform a quantum data locking protocol, providing the outside data processing device 12 with C bits of classical information. This decreases an uncertainty for determining the shared key in the outside data processing device 12 by more than the C bits due to potentially carrying out the collective measurements.

In contrast, by employing the proposed method for quantum key distribution, a quantum data locking protocol may be provided without providing the outside data processing device 12 with the shared key information, as discussed above. With the method, any probability changing information (which changes the combined probability $p_{(k)}^E$), must not be public. Hence, the combined probability $p_{(k)}^E$ must have the product form as in Eq. (9). This can be carried out by encrypting all the classical signals which are correlated with the shared key. Any key information correlated with the shared key changes the probability distribution $\{p_{(k)}^E\}$ because otherwise, further mutual information I(K: C) between information about the shared key and leaked information would be zero.

In case of employing the CASCADE method for error correction in the sixth step 26, the first parity bits of data blocks and the second parity bits of data blocks must be encrypted with the initial key. The data block information indicating the partitioning of the first and the second reconciled signal into the data blocks, on the other hand, may be transmitted publicly since the data block information is not correlated with shared key.

In case of employing the linear error-correcting code method, the syndrome must be encrypted with the initial key, but check matrix information indicating at least one of the plurality of check matrices may be transmitted publicly. In the method, all correlated data, in particular post-processing data, to be transmitted between the first and the second data processing device must be encrypted with the initial key.

In a seventh step 27, in order to minimize the information leakage, privacy amplification is applied to the shared key, yielding an amplified key, which is shorter than shared key. Depending on the privacy amplification, further eavesdropper information about the amplified key can be determined as close to zero.

To this end, hashing data is determined in one of the first data processing device (10) and the second data processing device (11), encrypted and transmitted to the other one of the first data processing device (10) and the second data processing device (11). Hence, the hashing data are distributed between the first data processing device (10) and the second data processing device (11). Using the hashing data as instruction data, a hashing method is applied to the shared key in both the first data processing device (10) and the second data processing device (11), yielding the amplified key in both the first data processing device (10) and the second data processing device (11). The hashing data may for example indicate a random selection of a binary Toeplitz matrix which is multiplied to the shared key as a vector.

Having thus distributed the (same) shared key and, preferably, the (same) amplified key in both the first data processing device 10 and the second data processing 11, further (classical) messages can be encrypted with the shared key or the amplified key and subsequently be transmitted from the first data processing device 10 to the second data processing 11 and/or from the second data processing device 11 to the first data processing 10.

With the proposed method, the amount of information leakage during the error correction becomes zero, while however exhausting the initial key. If a one-time pad method is used for encrypting the further messages, an equal amount of key information required for encryption is exhausted. If alternatively for example AES is used for encrypting the further messages, less of the key information required for encryption is exhausted. Preferably, a shared key length or an amplified key length is equal to a syndrome length or parity data length.

FIG. 3 shows a diagram comparing a) conventional quantum key distribution without encryption with the initial key and b) the proposed method with one-time pad. For both the conventional quantum key distribution and the proposed method, the second initial key is employed for authentication. In the embodiment of the method corresponding to FIG. 3 b), the second initial key is also used as the initial key.

In conventional quantum key distribution, an amount of initial key data 30 is increased by an amount of conventional shared key data 31, which can be used for subsequent encryption of further data. For the proposed method, additionally to the amount of initial key data 30, an amount of correlated key data 32 is employed for encrypting the correlated data that is correlated with, e.g., the shared key. Here however, the amount of key data that can be used for subsequent encryption of further data is not only increased by the amount of conventional shared key data 31, but further increased by a key gain 33. The key gain 33 is due to decreasing the second quantum mutual information I(A: E), i.e., decreasing the amount of information leakage to the outside data processing device 12. When AES or another classical cryptography method instead of the one-time pad is employed, the amount of correlated key data 32 key can be smaller, while retaining the key gain 33.

The proposed method can help legitimate users to increase the key rate. Potential information leakage to eavesdroppers is substantially reduced. Hardware modifications to the first data processing device 10 and the second data processing device 11 can be kept minimal if necessary. The method can be considered as quantum data locking protocol which locks correlations between data in the first data processing device 10 (as well as the second data processing device 11) on the one hand and the outside data processing device 12 on the other hand. Without being provided with the additional data such as the quantum measurement parameters, proper quantum measurements cannot be performed in the outside data processing device. The additional data includes probability distribution changing data and the correlated data. Security against an eavesdropper with, theoretically, access to unbounded quantum resources constitutes a challenge. The eavesdropper may obtain new information such as employed code words or other information correlated with the shared key or the amplified key at some point and carry out appropriate measurements. Thus the information leakage of 1 bits of initial key amount can provide the eavesdropper with more than 1 bits of information.

Importantly, however, for practically relevant cases with the eavesdropper having time-limited quantum memory, the proposed method works well. Thus, it is only required that there is no information leakage of information correlated with the shared key or the amplified key during a storage time in the quantum memory of the eavesdropper. If classical cryptography methods like AES are used for the encrypting with the initial key, the classical cryptography methods are assumed to be sufficiently secure during the storage time.

The method can be used with a B92-like protocol, a BB84 protocol, and for protocols where the first data processing device 10 and the third data processing device transmit respective quantum states to the second data processing device 11 such as measurement-device-independent quantum key distribution or twin-field quantum key distribution. Further protocols in which the first data processing device 10 and the second data processing device 11 are initial provided with a shared entangled state and/or in which a shared c-c-q state between first data processing device 10, the second data processing device 11, and a potentially eavesdropping outside data processing device 12 is generated can be employed as well.

B92-Like Protocol

In the following, another embodiment of the method, employing the B92-like protocol, is described. The outside data processing device 12 is configured to perform a beam splitting attack.

In the first step 21, the initial key is provided in the first data processing device 10 and the second data processing device 11. The initial key is also used for mutual authentication.

In the second step 22, the quantum signal comprising two coherent states $|\pm\alpha\rangle$ with intensity $\mu_A = \alpha^2$ (with real-valued $\alpha$) $|\pm\alpha\rangle$ is prepared in the first data processing device 10 and transmitted to the second data processing device 11. A type of prepared coherent state corresponds to one of the first digit positions of the first raw signal. In particular, a j-th prepared coherent state is assigned to a j-th first digit position of the first raw signal. For example, a first coherent state $|\pm\alpha\rangle$ may result in a corresponding one of the first digit position of the first raw signal being equal to 0, while a second coherent state $|-\alpha\rangle$ may result in the corresponding one of the first digit position of the first raw signal being equal to 1. The shared quantum state is described as a classical-quantum state $$\tfrac{1}{2}(|0\rangle\langle 0|_A \otimes |\alpha\rangle\langle\alpha|_B + |1\rangle\langle 1|_A \otimes |-\alpha\rangle\langle -\alpha|_B). \tag{11}$$

In a beam splitting attack scenario, channel losses can be simulated by the outside data processing device 12 by partially diverting the coherent states $|\pm\alpha\rangle$ to the outside memory 12a. The channel losses are given by a fall of intensity with $\mu_A \mapsto \mu_A 10^{-\delta l/10}$ with attenuation coefficient $\delta \approx 0.2$ dB/km for optical fibers and communication channel length l. Hence, the outside data processing device 12 is provided with outside coherent states with outside intensity $\mu_E = \mu_A(1 - 10^{-\delta l/10})$, and transmits second coherent states $|\pm\alpha_B\rangle$ with intensity $\mu_B = \mu_A 10^{-\delta l/10}$ to the second data processing device 11. An overall shared quantum state between the first data processing device 10, the second data processing device 11, and the outside data processing device 12 is given by $$\tfrac{1}{2}(|0\rangle\langle 0|_A \otimes |\alpha_B\rangle\langle\alpha_B|_B \otimes |\alpha_E\rangle\langle\alpha_E|_E + |1\rangle\langle 1|_A \otimes |-\alpha_B\rangle\langle-\alpha_B|_B \otimes |-\alpha_E\rangle\langle-\alpha_E|_E), \tag{12}$$

with $\alpha_B^2 = \mu_B$, $\alpha_E^2 = \mu_E$ and outside coherent states $|\pm\alpha_E\rangle$.

In the third step 23, the second coherent states $|\pm\alpha_B\rangle$ are measured in the second data processing device 11, using measurement parameters comprising a B92 observable $M_{B92} = \{M_0, M_1, M_?\}$ with measurement operators $$M_0 = \frac{I - |-\alpha_B\rangle\langle-\alpha_B|}{1 + \langle\alpha_B|-\alpha_B\rangle},$$

$$M_1 = \frac{I - |\alpha_B\rangle\langle\alpha_B|}{1 + \langle\alpha_B|-\alpha_B\rangle}, \tag{13}$$

$$M_? = I - M_0 - M_1,$$

each corresponding to one of the measurement outcomes. When measuring the second coherent states $|\pm\alpha_B\rangle$, a first measurement operator $M_0$ (corresponding to a first measurement outcome) and a second measurement operator $M_1$ (corresponding to a second measurement outcome) yield conclusive signal information, while a third measurement operator $M_?$ (corresponding to a third measurement outcome) yields inconclusive signal information. A determined measurement outcome of the measurement outcomes by measuring the second coherent states $|\pm\alpha_B\rangle$ is then assigned to one of the digit positions of the (second) raw signal. In particular, a j-th determined measurement outcome of the measurement outcomes by measuring the second coherent states $|\pm\alpha_B\rangle$ in a j-th iteration is assigned to a j-th digit position of the second raw signal.

In the fourth step 24, in case of using conventional quantum key distribution, inconclusive digit positions in the second raw signal corresponding to the third measurement outcome would be publicly transmitted from the second data processing device 11 (e.g., via a public channel) to the first data processing device 10. In the proposed method, the inconclusive digit positions are encrypted with the initial key to the encrypted signal before being transmitted from the second data processing device 11 to the first data processing device to. Further, the inconclusive digit positions are discarded in the second raw signal, yielding the second reconciled signal. After decrypting the encrypted signal in the first data processing unit to, the inconclusive digit positions are also discarded in the first raw signal, yielding the first reconciled signal.

In the fifth step 25, the error estimate of the first reconciled signal and the second reconciled signal is determined. The first error information comprising the first subset of first digit positions in the first reconciled signal and the second error information comprising the second subset of second digit positions in the second reconciled signal is respectively determined in the first and the second data processing device to, 11, mutually transmitted, and compared. The union of the first subset of first digit positions and the second subset of second digit positions is subsequently discarded from the first and the second reconciled signal. Since the first subset of first digit positions and the second subset of second digit positions are not correlated with remaining digit positions, the first subset of first digit positions and the second subset of second digit positions can be transmitted without encrypting the first subset of first digit positions and the second subset of second digit positions with the initial key.

Additionally or alternatively, the first error information and the second error information can for example comprise first parity bits of the first reconciled signal or parts thereof and second parity bits of the second reconciled signal or parts thereof, respectively. In this case, the first error information and the second error information are correlated with first reconciled signal and the second reconciled signal and hence to be encrypted before transmission.

After the fifth step 25, if the beam splitting attack has been carried out by the outside data processing device 12, the outside memory 12a can comprise the outside coherent states $|\pm\alpha_E\rangle$.

Transmitting parity bits can be beneficial for a small error rate. If, e.g., an observed error rate is at approximately 1%, transmitting woo bits with to errors provides an imprecise error estimate. It can be more beneficial to select woo data blocks of, e.g., length to, and transmit data block parity bits for each of the moo data blocks. A mismatch probability is much higher for the data block parity bits, and employing Bayes' theorem may provide a better error estimate. In this case, discarding digit positions would be unfavorable, but a leakage of the data block parity bits should be taken into account at least during the subsequent privacy amplification.

In the sixth step 26, the error correction of the first and the second reconciled signal is carried out. If, e.g., the first reconciled signal comprises a first string $s_A$=(01100101), and the second reconciled signal comprises a second string $s_B$=(01000101), the digit position 3 is erroneous. If the error estimate has been determined, it can be determined in this case that there is only one erroneous digit position. Hence, only the one erroneous digit position has to be located.

When employing the CASCADE method, the first string $s_A$ and the second string $s_B$ are randomly partitioned into the first data blocks and second data blocks, respectively. For each of the first data blocks and second data blocks, the first parity bits and second parity bits, respectively, are determined, encrypted and transmitted between the first data processing device 10 and the second data processing device 11. The erroneous digit position is located via a binary search.

The first string $s_A$ has parity 0 and the second string $s_B$ has parity 1. First halves (0110) and (0100) of the first string $s_A$ and the second string $s_B$, respectively have parity 0 and 1, respectively. Since the first halves have different parity, the erroneous digit position is located within the first halves. Further halving the first halves yields first quarters (01), (01) and second quarters (10), (00) of the first string $s_A$ and the second string $s_B$. The first quarters (01), (01) of the first string $s_A$ and the second string $s_B$ coincide and have the same parity. Hence, the erroneous digit position is located in the second quarters (10), (00) of the first string $s_A$ and the second string $s_B$, namely at the digit position 3.

In order to locate the erroneous digit position, four first and second parity bits had to be transmitted between the first data processing device 10 and the second data processing device it In case of employing the linear block code method, a binary-valued check matrix (which can be transmitted publicly) such as $$H = \begin{pmatrix} 1 & 1 & 0 & 1 & 0 & 0 & 1 & 0 \\ 0 & 1 & 1 & 0 & 1 & 0 & 0 & 1 \\ 1 & 0 & 1 & 0 & 0 & 1 & 1 & 0 \\ 0 & 0 & 0 & 1 & 1 & 1 & 0 & 1 \end{pmatrix} \quad (14)$$

is used to calculate the first syndrome $z_A$=$Hs_A^T$=$(1100)^T$ and the second syndrome $z_B$=$Hs_B^T$=$(1010)^T$. The first syndrome $z_A$ is encrypted and transmitted from the first data processing device 10 to the second data processing device 11. Alternatively, the second syndrome $z_B$ is encrypted and transmitted from the second data processing device 11 to the first data processing device 10. Subsequently, an error syndrome $z_E$=$z_A \otimes z_B$=$(0110)^T$ is determined in both the first data processing device 10 and the second data processing device 11. An error vector e as then determined from an error syndrome equation system $$He = z_E. \quad (15)$$

Since the error syndrome equation system is underdetermined, the error vector e can, e.g., be determined via maximum likelihood or 1-norm-minimization. Here, the error vector e is determined to be $(00100000)^T$. Hence, the erroneous digit position is located.

In case of direct reconciliation, the first string $s_A$ is regarded as the correct one, and the second string $s_B$ is corrected, yielding the shared key (01100101). In case of reverse reconciliation, the second string $s_B$ is regarded as the correct one, and the first string $s_A$ is corrected, yielding the shared key (01000101).

When the first and the second parity data comprise data correlated with the first and the second reconciled signal (such as the first parity bits and the second parity bits, when the CASCADE method is used, or the first and the second syndrome, when linear block codes are used), the first and the second parity data should be encrypted, e.g., employing classical methods of encryption like AES or one-time pad, depending on security requirements.

In conventional quantum key distribution, the second quantum mutual information I(A: E) leaked to the outside data processing device 12 is bounded by the Holevo value of the outside coherent states $|\pm\alpha_E\rangle$ in the outside memory 12a, i.e., $$I(A:E) \leq \chi(\{|\pm\alpha_E\rangle\}) = h_2\left(\frac{1 - e^{-2\mu_A\left(1-10^{-\frac{\delta l}{10}}\right)}}{2}\right), \quad (16)$$

with binary Shannon entropy $h_2(x) = -x \log x - (1-x) \log (1-x)$.

In contrast, with the proposed method, the second quantum mutual information I(A: E) is bounded by a one-shot capacity $C_1$, which corresponds to carrying out only individual measurements instead of collective measurements. A best discrimination of the outside coherent states $\{|\pm\alpha_E\rangle\}$ corresponds to an error probability $q = \frac{1}{2}(1 - 1 - e^{-4\mu_A(1-10^{-\delta l/10})})$. Hence, the second quantum mutual information I(A: E) is bounded as $$I(A:E) \leq C_1 = 1 - h_2\left(\frac{1 - \sqrt{1 - e^{4\mu_A\left(1-10^{-\frac{\delta l}{10}}\right)}}}{2}\right). \quad (17)$$

In the seventh step 27, the shared key is shortened to the amplified key, thus minimizing the information leakage to the outside data processing device 12. To this end, a random binary Toeplitz matrix T, e.g., $$T = \begin{pmatrix} 1 & 0 & 0 & 1 & 0 & 1 & 1 & 0 \\ 0 & 1 & 0 & 0 & 1 & 0 & 1 & 1 \\ 1 & 0 & 1 & 0 & 0 & 1 & 0 & 1 \\ 1 & 1 & 0 & 1 & 0 & 0 & 1 & 0 \\ 0 & 1 & 1 & 0 & 1 & 0 & 0 & 1 \end{pmatrix} \quad (18)$$

is determined and publicly shared. The Toeplitz matrix T is uniquely identifiable by its first row and its first column. Hence, in order to share the Toeplitz matrix T, transmitting the (encrypted) hashing data merely comprising the first row and the first column is sufficient. The amplified key is determined by multiplying, preferably left-multiplying, the Toeplitz matrix T to the shared key. A row number of the Toeplitz matrix T depends on estimating the second quantum mutual information I(A: E): the larger the information leakage that has been estimated, the shorter the amplified key.

Encrypting the correlated data can be particularly useful in a situation where the one-time pad method has been used for encryption, however certain previously secure information of the amplified key has been publicly transmitted (without encryption). If there is information leakage of certain digit positions of the amplified key, the combined probability $p_{(k)}^E$ is changed, thus enabling the outside data processing device 12 to carry out the collective measurements. Still, leaking l bits of the initial key can provide an eavesdropping device with more than l bits of information. However, when encrypting the correlated data, carrying out the collective measurement is made impossible, while the amplified key can still be distributed according to the proposed method.

Employing the one-time pad method requires a comparably large amount of key data with diminished key gain. Thus, an encryption method such as AES may be preferable. Notably, the encryption method has to provide that encryption cannot be broken by the outside data processing device 12 during storage time of outside coherent states $|\pm\alpha_E\rangle$.

FIG. 4 shows a graphical representation of a simulated key rate r as a function of the communication channel length l for conventional quantum key distribution and the proposed method. The channel losses are given with $\mu_A \mapsto \mu_A 10^{-\delta l/10}$ with the attenuation coefficient $\delta \approx 0.2$ dB/km for optical fibers.

A first curve 40 represents the key rate for the proposed method for the B92-like protocol, a second curve 41 represents the key rate for a conventional B92-like quantum key distribution method, and a third curve 42 represents a key rate ratio between the proposed method and conventional quantum key distribution. The third curve 42 approaches for large channel length l a key rate value close to 1.75, corresponding to more than 70% of key gain. For the first curve 40 and the second curve 41, a conclusive result probability $p_{conc}$ for the second data processing device 11 is taken into account:

$$r = p_{conc}(1 - \text{leak}(q) - I(A:E)) = \quad (19)$$
$$\left(1 - e^{-2\mu_A 10^{-\delta l/10}}\right) \cdot (1 - \text{leak}(q) - I(A:E)).$$

The intensity $\mu_A$ at the first data processing device 10 is optimized for every channel length. For simplifying Eq. (19), a channel error rate q is assumed to be zero. In any practical system, however, the channel error rate q is positive. Hence, encrypting the correlated information can be useful to increase the key rate r.

BB84 Protocol

In the following, a further embodiment of the method, employing the BB84 protocol, is described. The steps 21 to 27 are to be carried out correspondingly to the B92-like protocol embodiment. Differences in the steps 21 to 27 from the B92-like protocol embodiment are as follows. As opposed to the B92-like protocol, there is no simple attack type like the beam splitting attack for a single-photon BB84 protocol.

In the second step 22, first photonic quantum states $$\left\{|0\rangle, |1\rangle, |+\rangle = \frac{1}{\sqrt{2}}(|0\rangle + |1\rangle), |-\rangle = \frac{1}{\sqrt{2}}(|0\rangle - |1\rangle)\right\} \quad (20)$$

are transmitted from the first data processing device 10 to the second data processing device 11. The first photonic quantum states may correspond to a photon being horizontally polarized, vertically polarized, diagonally polarized, and anti-diagonally polarized, respectively. Two measurement bases +, x are employed, the HV (horizontal/vertical) basis + and the AD (anti-diagonal/diagonal) basis x. The shared quantum state for digit position is described as a photonic classical-quantum state $$\tfrac{1}{4}(|0_+\rangle\langle 0_+|_A \otimes |0\rangle\langle 0|_B + |1_+\rangle\langle 1_+|_A \otimes |1\rangle\langle 1|_B +$$
$$|0_x\rangle\langle 0_x|_A \otimes |+\rangle\langle +|_B + |1_x\rangle\langle 1_x|_A \otimes |-\rangle\langle -|_B). \quad (21)$$

In the collective attack scenario, an ancillary photonic quantum state is appended to each photonic classical-quantum state and a unitary operation is carried by the outside data processing device 12, entangling a resulting state. The overall shared state between the first data processing device 10, the second data processing device 11, and the outside data processing device 12 is given by $$\tfrac{1}{4}(|0_+\rangle\langle 0_+|_A \otimes |\Psi_{0_+}\rangle\langle\Psi_{0_+}|_{BE} + |1_+\rangle\langle 1_+|_A \otimes$$
$$|\Psi_{1_+}\rangle\langle\Psi_{1_+}|_{BE} + |0_x\rangle\langle 0_x|_A \otimes |\Psi_+\rangle\langle\Psi_+|_{BE} +$$
$$|1_x\rangle\langle 1_x|_A \otimes |\Psi_-\rangle\langle\Psi_-|_{BE}). \quad (22)$$

In the third step 23, a second photonic quantum state is measured in the second data processing device 11 using a BB84 observable M with measurement operators $$M_0 = \tfrac{1}{2}|0\rangle\langle 0|, M_1 = \tfrac{1}{2}|1\rangle\langle 1|, M_+ = \tfrac{1}{2}|+\rangle\langle +|, M_- =$$
$$\tfrac{1}{2}|-\rangle\langle -|. \quad (23)$$

Subsequently, outside photonic quantum states in the outside data processing device 12 are represented by:

$$\rho_0^E = (1-q)|\psi_0\rangle\langle\psi_0| + q|\theta_0\rangle\langle\theta_0|,$$
$$\rho_1^E = (1-q)|\psi_1\rangle\langle\psi_1| + q|\theta_1\rangle\langle\theta_1|,$$
$$\rho_+^E = (1-q)|\psi_+\rangle\langle\psi_+| + q|\theta_+\rangle\langle\theta_+|,$$
$$\rho_-^E = (1-q)|\psi_-\rangle\langle\psi_-| + q|\theta_-\rangle\langle\theta_-|, \quad (24)$$

with second data processing device error probability q.

In the fourth step 24, the first encrypted signal indicating the quantum preparation parameters (i.e., first quantum basis settings) which were employed for preparing the first photonic quantum states are generated in the first data processing device 10 with the initial key and transmitted to the second data processing device 11. Conversely, the second encrypted signal indicating the quantum measurement parameters (i.e., second quantum basis settings) which were employed for measuring the second photonic quantum states are generated in the second data processing device 11 with the initial key and are transmitted to the first data processing device 10.

Non-matching digit positions of the first raw signal and the second raw signal, at which a corresponding one of the first quantum basis settings and a corresponding one of the second quantum basis settings do not match, are discarded, yielding the first reconciled signal and the second reconciled signal, respectively.

In order to discriminate between 0 and 1 without knowing first or second quantum basis settings, non-orthogonal outside photonic quantum states $(\rho_0^E + \rho_+^E)/2$ and $(\rho_1^E + \rho_-^E)/2$ must be discriminated in the outside data processing device 12. This is more difficult than discriminating between further outside photonic quantum states $\rho_0^E$ and $\rho_1^E$ (or $\rho_+^E$ and $\rho_-^E$) in case the first or second quantum basis settings are provided in the third data processing device 12. Hence, the first or second quantum basis settings should be private, as well as matching digit positions.

The features disclosed in this specification, the figures and/or the claims may be material for the realization of various embodiments, taken in isolation or in various combinations thereof.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for quantum key distribution, the method, in a system comprising a plurality of data processing devices, comprising:
   providing an initial key in a first data processing device and a second data processing device;
   providing, in the second data processing device, a quantum signal comprising a plurality of quantum states;
   determining, in the second data processing device, a plurality of quantum measurement parameters;
   determining, in the second data processing device, a raw signal by quantum measuring the plurality of quantum states employing the plurality of quantum measurement parameters;
   generating with the initial key, in the second data processing device, an encrypted signal indicating at least one the plurality of quantum measurement parameters and transmitting the encrypted signal to the first data processing device;
   determining, in at least one of the first data processing device and the second data processing device, a reconciled signal from the encrypted signal; and
   determining, in at least one of the first data processing device and the second data processing device, a shared key from the reconciled signal by correcting the reconciled signal.

2. The method according to claim 1, further comprising at least one of:
- determining, in the first data processing device, a plurality of quantum preparation parameters;
- preparing, in the first data processing device, a first quantum signal comprising a plurality of first quantum states from a first raw signal employing the plurality of quantum preparation parameters;
- transmitting the first quantum signal from the first data processing device to the second data processing device, thereby providing the quantum signal comprising the plurality of quantum states in the second data processing device;
- generating with the initial key, in the first data processing device, a first encrypted signal indicating at least one the plurality of quantum preparation parameters and transmitting the first encrypted signal to the second data processing device;
- determining, in the second data processing device, the reconciled signal from the raw signal and the first encrypted signal; and
- determining, in the first data processing device, a first reconciled signal from the first raw signal and the encrypted signal.

3. The method according to claim 2, wherein at least one of the plurality of quantum measurement parameters and/or at least one of the plurality of quantum preparation parameters comprises a quantum basis setting.

4. The method according to claim 2, wherein at least one of the following is provided:
- each one of digit positions of the raw signal in the second data processing device corresponds to one of the plurality of quantum measurement parameters and to one of the plurality of quantum states;
- the reconciled signal is determined in the second data processing device from the raw signal and the first encrypted signal by discarding one of the digit positions of the raw signal if a corresponding one of the plurality of quantum measurement parameters and a corresponding one of the quantum preparation parameters from the first encrypted signal do not match;
- each one of first digit positions of the first raw signal in the first data processing device corresponds to one of the plurality of quantum preparation parameters and to one of the plurality of first quantum states; and
- the first reconciled signal is determined in the first data processing device from the first raw signal and the encrypted signal by discarding one of the first digit positions of the first raw signal if a corresponding one of the plurality of quantum measurement parameters from the encrypted signal and a corresponding one of the quantum preparation parameters do not match.

5. The method according to claim 2, further comprising at least one of:
- generating, in the first data processing device, first parity data from the first reconciled signal,
- encrypting, in the first data processing device, the first parity data to encrypted first parity data with the initial key and transmitting the encrypted first parity data to the second data processing device;
- generating, in the second data processing device, second parity data from the reconciled signal,
- encrypting, in the second data processing device, the second parity data to encrypted second parity data with the initial key and transmitting the encrypted second parity data to the first data processing device;
- determining, in the first data processing device and the second data processing device, differences of the first reconciled signal and the reconciled signal employing the first parity data and the second parity data; and
- determining, in the first data processing device, the shared key from the first reconciled signal by correcting the first reconciled signal with respect to the differences of the first reconciled signal and the reconciled signal and determining, in the second data processing device, the reconciled signal as the shared key.

6. The method according to claim 5, wherein:
- the first parity data comprise first parity bits of first data blocks of the first reconciled signal and the second parity data comprise second parity bits of second data blocks of the reconciled signal; or
- the first parity data comprise a first syndrome of the first reconciled signal and the second parity data comprise a second syndrome of the reconciled signal.

7. The method according to claim 1, further comprising at least one of:
- generating, in the first data processing device, first error information from the first reconciled signal, preferably encrypting the first error information to encrypted first error information with the initial key, and further preferably transmitting the first error information or the encrypted first error information to the second data processing device;
- generating, in the second data processing device, second error information from the reconciled signal, preferably encrypting the second error information to encrypted second error information with the initial key, and further preferably transmitting the second error information or the encrypted second error information to the first data processing device;
- determining, in the first data processing device and the second data processing device, from the first error information and the second error information an error estimate of the first reconciled signal and the reconciled signal; and
- discarding erroneous parts of the first reconciled signal and the reconciled signal employing the first error information and the second error information.

8. The method according to claim 1, further comprising:
- in the first data processing device and/or the second data processing device, determining hashing data and encrypting the hashing data to encrypted hashing data with the initial key;
- transmitting the encrypted hashing data to the second data processing device and/or the first data processing device; and
- determining, in the first data processing device and the second data processing device, an amplified key from the shared key by applying a hashing method using the hashing data.

9. The method according to claim 8, wherein at least one of the first parity data, the second parity data, and the hashing data comprise correlated data which are correlated with at least one of the reconciled signal, the first reconciled signal, the shared key, and the amplified key.

10. The method according to claim 8, further comprising at least one of:
- generating, in the first data processing device, first uncorrelated parity data which are which are not correlated with at least one of the first reconciled signal, the shared key, and the amplified key and transmitting the first uncorrelated parity data to the second data processing device; and generating, in the second data processing device, second uncorrelated parity data which are not correlated with at least one of the reconciled signal, the shared key, and the amplified key and transmitting the second uncorrelated parity data to the first data processing device.

11. The method according to claim 1, further comprising:
providing a second initial key in the first data processing device and the second data processing device and
authenticating the first data processing device and the second data processing device by the second initial key.

12. The method according to claim 1, wherein the shared key and/or the amplified key is determined only in the first data processing device and a third data processing device and wherein the method further comprises:
providing the initial key in the third data processing device;
determining, in the third data processing device, a plurality of further quantum preparation parameters;
preparing, in the third data processing device, a third quantum signal comprising a plurality of third quantum states from a third raw signal employing a plurality of further quantum preparation parameters;
transmitting the third quantum signal from the third data processing device to the second data processing device.

13. The method according to claim 1, wherein each of the plurality of quantum states is a reduced state of one of a plurality of shared entangled quantum states between the first data processing device and the second data processing device.

14. The method according to claim 1, wherein the initial key is provided using an RSA method or a Diffie-Hellman method.

15. A system for quantum key distribution comprising a plurality of data processing devices and configured to perform:
providing an initial key in a first data processing device and a second data processing device;
providing, in the second data processing device, a quantum signal comprising a plurality of quantum states;
determining, in the second data processing device, a plurality of quantum measurement parameters;
determining, in the second data processing device, a raw signal by quantum measuring the plurality of quantum states employing the plurality of quantum measurement parameters;
generating with the initial key, in the second data processing device, an encrypted signal indicating at least one the plurality of quantum measurement parameters and transmitting the encrypted signal to the first data processing device;
determining, in at least one of the first data processing device and the second data processing device, a reconciled signal from the encrypted signal; and
determining, in at least one of the first data processing device and the second data processing device, a shared key from the reconciled signal by correcting the reconciled signal.

* * * * *